No. 732,121. PATENTED JUNE 30, 1903.
F. SCHMITZ.
COASTER BRAKE.
APPLICATION FILED APR. 30, 1902.
NO MODEL. 4 SHEETS—SHEET 1.
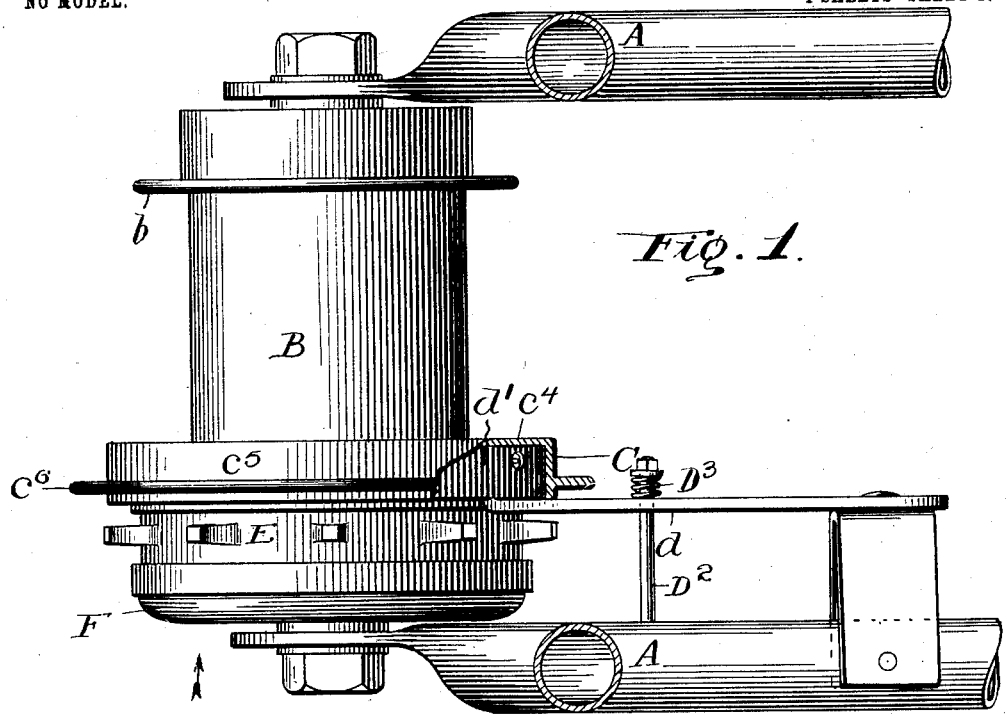
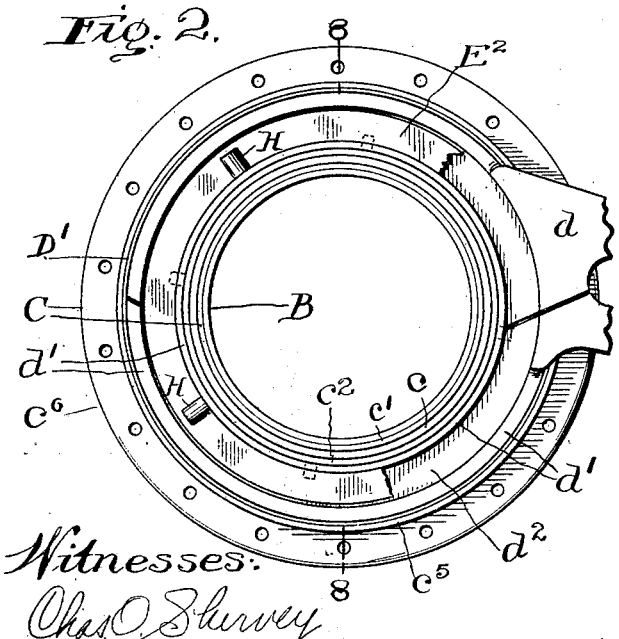
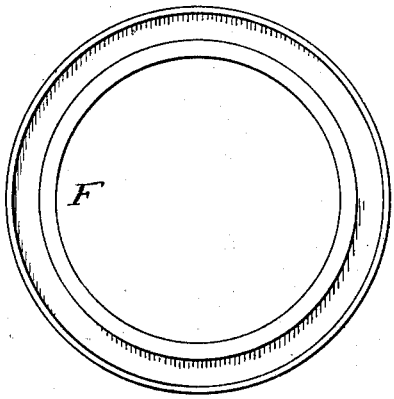
Witnesses:
Chas O Shurvey
S. Bliss
Inventor:
Frank Schmitz
by H Bitner
Atty.

No. 732,121. PATENTED JUNE 30, 1903.
F. SCHMITZ.
COASTER BRAKE.
APPLICATION FILED APR. 30, 1902.
NO MODEL. 4 SHEETS—SHEET 2.
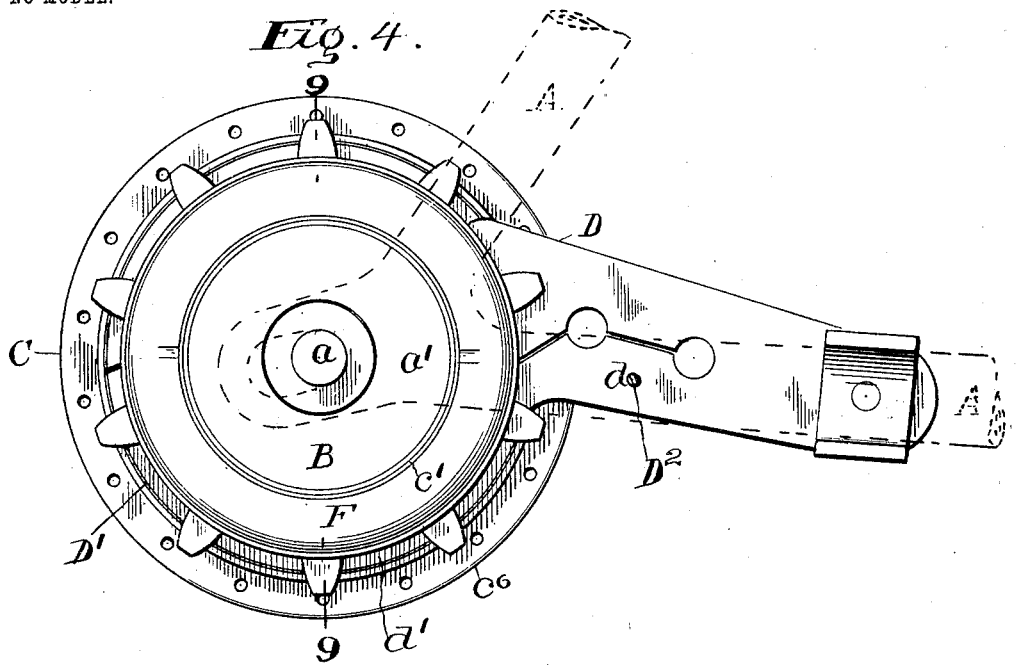
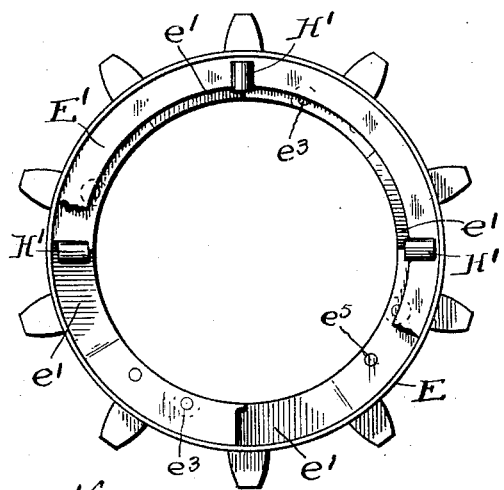
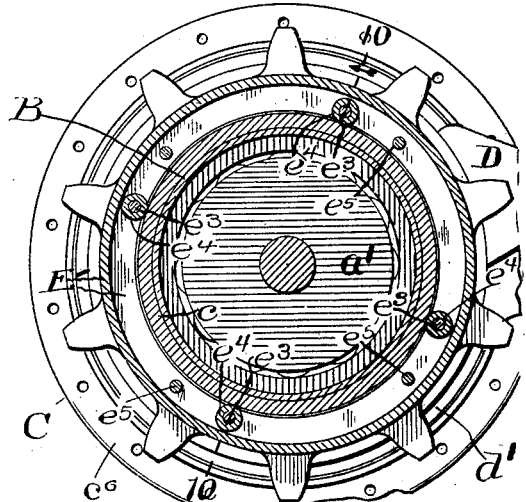
Witnesses:
Chas. O. Shurvey
S. Bliss
Inventor:
Frank Schmitz
by H. Bitner
Atty.

No. 732,121. PATENTED JUNE 30, 1903.
F. SCHMITZ.
COASTER BRAKE.
APPLICATION FILED APR. 30, 1902.
NO MODEL. 4 SHEETS—SHEET 3.

Witnesses:
Chas. O. Shurvey
S. Bliss.

Inventor:
Frank Schmitz
by H. Bitner
Atty.

No. 732,121. PATENTED JUNE 30, 1903.
F. SCHMITZ.
COASTER BRAKE.
APPLICATION FILED APR. 30, 1902.
NO MODEL. 4 SHEETS—SHEET 4.
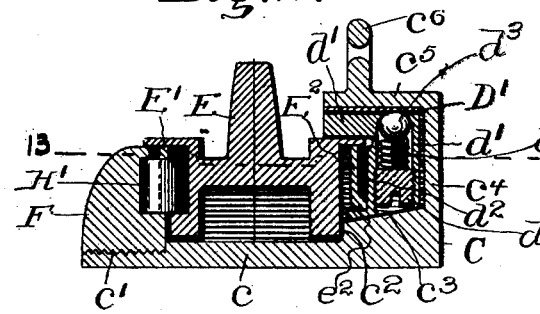
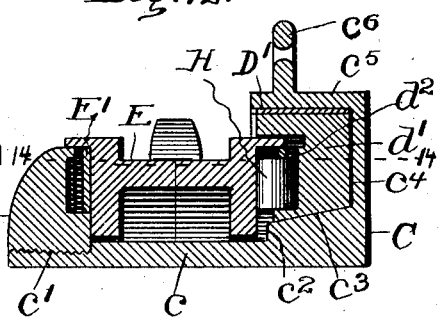
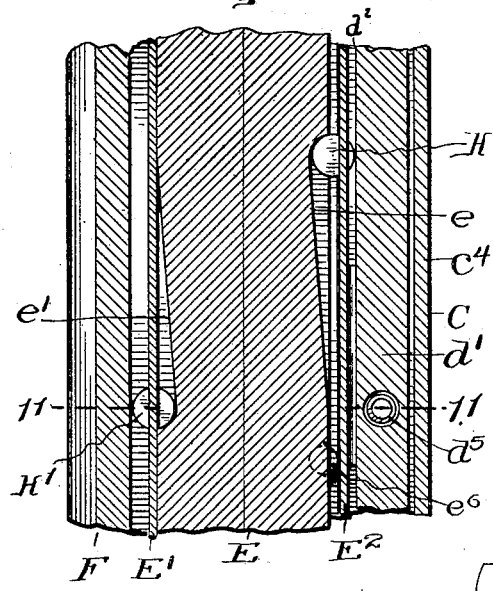
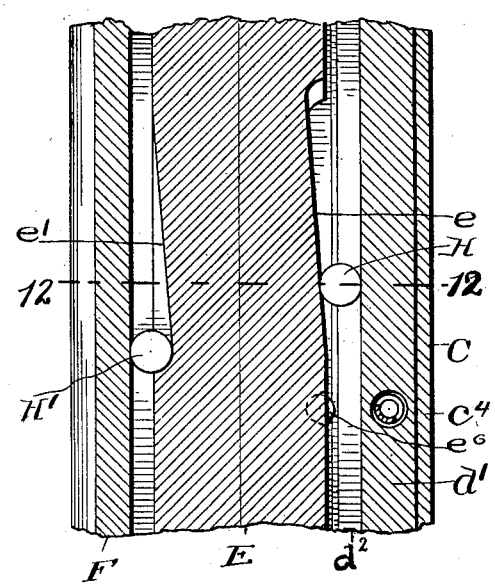
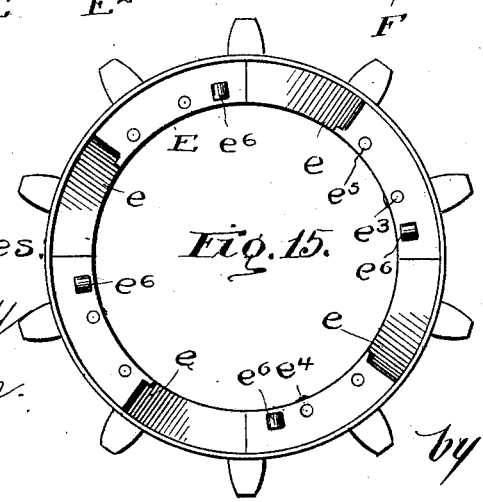
Witnesses:
Chas. O. Shurvey
S. Bliss.
Inventor:
Frank Schmitz
by H. Bitner
Atty.

No. 732,121. Patented June 30, 1903.

UNITED STATES PATENT OFFICE.

FRANK SCHMITZ, OF CHICAGO, ILLINOIS.

COASTER-BRAKE.

SPECIFICATION forming part of Letters Patent No. 732,121, dated June 30, 1903.

Application filed April 30, 1902. Serial No. 105,277. (No model.)

*To all whom it may concern:*

Be it known that I, FRANK SCHMITZ, a citizen of the United States of America, residing at Chicago, in the county of Cook and State of Illinois, have invented certain new and useful Improvements in Coaster-Brakes, of which the following is a specification.

My invention relates to certain new and useful improvements in coaster-brakes; and its object is to provide a device of this class which shall operate quickly and positively and which shall release instantly when desired.

To this and certain minor ends my invention consists in certain novel features of construction, which are illustrated in the accompanying drawings and described in this specification.

Figure 7:
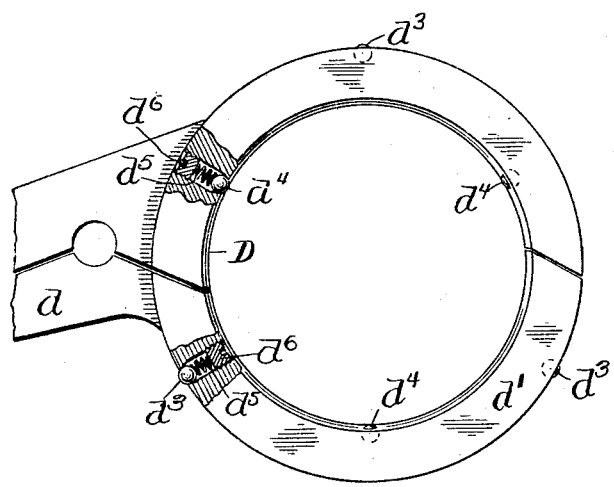
Figure 8:
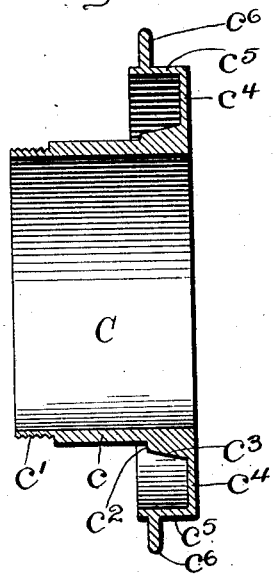
Figure 9:
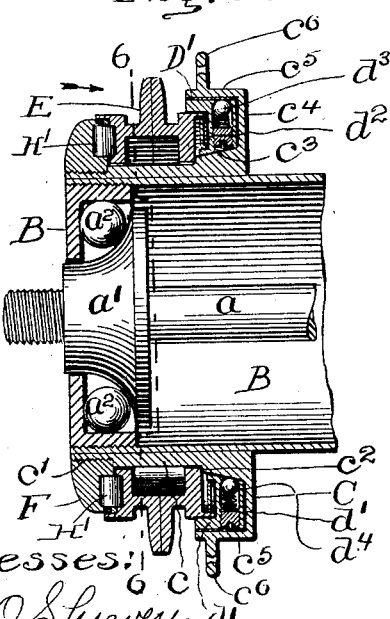
Figure 10:
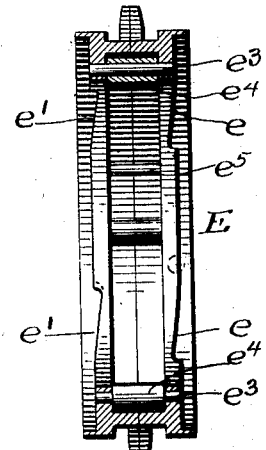

In the drawings, Figure 1 is a top plan of the rear forks of a bicycle, showing a hub and sprocket provided with my coaster-brake, the rear stays of the frame and certain portions of the hub being cut away. Fig. 2 is a side view of the hub and stationary member, the frame, bearings, and sprocket being removed. Fig. 3 is a view of the flange at the right-hand end of the hub looking from the inside. Fig. 4 is a side view of the hub, sprocket, and stationary member, the frame of the bicycle being shown in dotted lines. Fig. 5 is a side view of the sprocket, dogs, and the spacing-ring therefor looking in the direction of the arrow in Fig. 1. Fig. 6 is a section in the line 6 6 of Fig. 9 looking in the direction of the arrow. Fig. 7 is a view of the stationary member looking from the inside of the hub, certain parts being shown in section. Fig. 8 is a section of the hub-flange in the line 8 8 of Fig. 2. Fig. 9 is a section in the line 9 9 of Fig. 4. Fig. 10 is a section through the sprocket in the line 10 10 of Fig. 6. Fig. 11 is an enlarged view of the upper part of Fig. 9, the line of section being also indicated at 11 11 of Fig. 13, the parts being in the coasting position. Fig. 12 is an enlarged detail section in the line 12 12 of Fig. 14, showing the parts in the locked position—viz., the wheel locked to the frame of the bicycle. Fig. 13 is a section taken in a curved plane, part of which is indicated by the line 13 13 of Fig. 11, the section being in a plane parallel to the circumference of the hub and spread out as shown. Fig. 14 is a similar section in the line 14 14 of Fig. 12, the spacing-rings being omitted; and Fig. 15 is a view of the sprocket, showing certain additional improvements.

Referring to the drawings, A is the frame of a bicycle supported by an axle $a$, which carries cones $a'$ and antifriction-balls $a^2$ of the ordinary type. Upon these antifriction-balls runs a hub B, having at its left end a flange $b$, adapted to receive suitable spokes. At its right end is another flange C, the form of which is shown in Fig. 8. It consists of a cylindrical portion $c$, having at one end a screw-threaded portion $c'$. The cylindrical portion terminates in a shoulder $c^2$, from which extends a conical portion $c^3$, as shown. From the end of this portion runs a radial web $c^4$, terminating in a backwardly-extending portion $c^5$, which has a flange $c^6$, adapted to receive the other spokes of the wheel. The conical portion $c^3$, the radial web $c^4$, and the backwardly-extending portion $c^5$ form together an annular groove, as shown. In this groove is an annular portion of a stationary member which is usually used in coaster-brakes. The stationary member (designated by the letter D) consists of an arm $d$, adapted to engage one of the rear forks of the bicycle, and an annular portion $d'$, attached thereto. The annular portion $d'$ is split, as shown in Figs. 4 and 7, so that it can be expanded in diameter when desired. This annular portion is offset from the arm $d$ and runs in the annular groove heretofore described. The inner surface of the annular portion $d'$ is formed to coincide with the conical surface $c^3$ of the flange C. The annular portion $d'$ is also provided with an annular groove $d^2$, the cross-section of which is clearly illustrated through Figs. 11 and 12. It is evident that pressure upon the stationary member D toward the web $c^4$ of the flange C would force it up upon the conical surface $c^3$ and expand it, so as to force its outer surface into engagement with the backwardly-extending portion $c^5$ of the flange. This will of course prevent rotation of the flange, and consequently of the hub. This is the operation which takes place when the brake is applied. In order to avoid a sudden locking of the parts, I interpose between the stationary member D and the backwardly-extending portion $c^5$ a cylindrical ring D'. This tends, when the brake is applied, to prevent any sudden locking and consequent jarring of the parts.

The sprocket-wheel E runs loose upon the cylindrical portion $c$ of the flange C. This sprocket-wheel is provided upon each side with a series of tapered depressions $e\ e'$, ending comparatively steeply, the depressions $e$ being upon the inside of the sprocket and the depressions $e'$ being on the outside of the sprocket. Outside of the sprocket is an outer flange F, secured to the screw-threaded portion $c'$ of the flange C. Between the sprocket and the vertical annularly-grooved faces of the flanges C and F are confined two series of dogs H H', preferably roller-dogs, which operate as do the ordinary dogs of coaster-brakes. It will be seen that forward rotation of the sprocket will draw the dogs H' upon the outside of the sprocket-wheel between it and the flange F into the narrowed portion of the depressions $e'$, thereby producing engagement between the sprocket and the flange F. The sprocket will be forced against the shoulder $c^2$ of the flange C, and the whole system, with the exception of the stationary member D, will be tightly locked together, so that continued forward rotation of the sprocket will rotate the hub and wheel. It is evident that stopping the forward motion of the sprocket will permit the wheel to run on, the dogs thereby running into the deeper ends of the depressions $e'$, thereby releasing the engagement between the sprocket and the hub, the hub then running on by itself from its own momentum. Backward rotation of the hub will in the same way force the dogs H on the inside of the sprocket-wheel between it and the stationary member into the shallow ends of the depressions $e$, thereby producing a thrust upon the stationary member. The stationary member will be forced inward and the operation of applying the brakes heretofore described will take place—that is, the member will rise upon the conical portion and be spread out into engagement with the backwardly-extending portion $c^5$ of the flange C. When the sprocket is again moved forward, the elasticity of the stationary member will cause it to return to its original position. To make perfectly sure of the return of the stationary member D when the thrust is removed, I use a rod $D^2$, running from the part $d$ to the rear fork of the frame, and this rod confines between its end and the member a coiled spring $D^3$, which insures the return of the member to its proper place. This is substantially the operation of the machine.

In order to procure greater efficiency, I have provided a number of devices for use with this brake, the operation of which I will now proceed to describe. These devices are intended to decrease the friction and generally to promote the efficiency of the machine; but any or all of them might be dispensed with, if desired. The stationary member D is provided with a number of antifriction-balls $d^3$ $d^4$, the balls $d^3$ being upon the outside of the member and in contact with the ring D' and the balls $d^4$ being upon the inside and in contact with the conical surface $c^3$ of the flange C. These balls are inserted in holes made for the purpose extending through the member and are held in place by coiled springs $d^5$, which springs are backed up by screws $d^6$, screwed into the opposite end of the perforations. This construction is clearly shown in Figs. 7, 9, and 11. The coiled springs permit the balls to be crowded out of place when the brake is set, and the balls prevent undue friction when the stationary member is sliding upon the hub, as is the case when a bicycle fitted with this device is running in the ordinary way.

Spacing-rings are used for the dogs upon both sides of the sprocket, and their form is clearly shown in the drawings, the spacing-ring upon the outside of the sprocket being shown in Figs. 5 and 13, where it is designated by the letter E', and the spacer on the opposite side of the sprocket being shown in Figs. 11 and 13, where it is designated by $E^2$. The spacing-ring $E^2$ upon the inside of the sprocket is provided with a projecting shoulder $e^2$, (see Fig. 11,) which keeps it approximately at the middle of the space provided for the dogs. The spacer upon the other side may lie close against the sprocket-wheel. For greater convenience of construction the sprocket-wheel E is made in two pieces. As shown, these pieces are secured together by pins $e^3\ e^5$. Upon the pins $e^3$ are antifriction-rollers $e^4$, which bear upon the cylindrical portion $c$ of the flange C, thereby decreasing the friction of the sprocket upon the hub when the wheel is running loose. I consider this particularly desirable, inasmuch as it is very desirable to dispense with friction when the bicycle is coasting. I have also provided certain antifriction-rollers $e^6$ in the face of the sprocket to reduce the friction between it and the stationary member. Their function and operation are obvious, and the saving of power by their use is considerable.

I claim as new and desire to secure by Letters Patent—

1. In a device of the class described, the combination with a hub and a gear running loose thereon, of a flange upon said hub having a conical surface and a fixed split ring upon said conical surface, of means whereby motion of said gear may force said fixed split ring up upon said conical surface to expand it and means whereby said expansion may lock said hub, substantially as described.

2. In a device of the class described, the combination with a hub and a gear running loose thereon, of a flange, C, upon said hub having a conical surface, $c^3$, and a backwardly-extending portion, $c^5$, a fixed split ring between said conical portion and said backwardly-extending portion and means whereby motion of said gear in one direction may force said fixed split ring up upon said conical portion to expand it and bring it into contact with said backwardly-extending portion, substantially as described.

3. In a device of the class described, the combination with the frame and axle of a vehicle, a hub supported thereby, and a gear running loose upon said hub, of a flange C, upon said hub having a conical portion, $c^3$, and a backwardly-extending portion, $c^5$, a split ring supported between said conical portion and said backwardly-extending portion, said split ring being non-rotatably secured to said frame, and means whereby motion of said gear in one direction may force said split ring up upon said conical portion to expand it into contact with said backwardly-extending portion, substantially as described.

4. In a device of the class described, the combination with a hub and stationary member running thereon, a sprocket-wheel also loose thereon and means for exerting a positive thrust upon said member away from said sprocket-wheel and into engagement with said hub, of means for positively drawing said stationary member toward said sprocket when such thrust is removed, substantially as described.

In witness whereof I have hereunto set my hand, at Chicago, in the county of Cook and State of Illinois, this 4th day of April, A. D. 1902.

FRANK SCHMITZ.

Witnesses:
   CHAS. O. SHERVEY,
   S. BLISS.